United States Patent
Lee et al.

(10) Patent No.: US 7,437,173 B2
(45) Date of Patent: Oct. 14, 2008

(54) METHOD FOR TRANSMITTING POWER CONTROL BITS AND DETECTING POWER CONTROL RATE

(75) Inventors: Young Jo Lee, Gunpo-si (KR); Cheol Woo You, Seoul (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 10/505,115

(22) PCT Filed: Feb. 18, 2003

(86) PCT No.: PCT/KR03/00334

§ 371 (c)(1),
(2), (4) Date: Aug. 18, 2004

(87) PCT Pub. No.: WO03/069808

PCT Pub. Date: Aug. 21, 2003

(65) Prior Publication Data

US 2005/0143113 A1    Jun. 30, 2005

(30) Foreign Application Priority Data

Feb. 18, 2002    (KR) ............... 10-2002-0008458

(51) Int. Cl.
*H04B 7/00* (2006.01)
(52) U.S. Cl. ................................. 455/522; 455/69
(58) Field of Classification Search ............. 455/522, 455/69
See application file for complete search history.

(56) References Cited

U.S. PATENT DOCUMENTS

| | | | |
|---|---|---|---|
| 5,396,516 A | 3/1995 | Padovani et al. | 375/225 |
| 5,603,096 A * | 2/1997 | Gilhousen et al. | 455/69 |
| 7,263,077 B1 * | 8/2007 | Hamalainen et al. | 370/311 |
| 2003/0189911 A1 * | 10/2003 | Saifuddin et al. | 370/335 |
| 2004/0087331 A1 * | 5/2004 | Hwang et al. | 455/522 |

FOREIGN PATENT DOCUMENTS

| | | |
|---|---|---|
| KR | 10-0176100 B1 | 11/1998 |
| KR | 10-20000-002078 A | 1/2000 |
| KR | 000002078 | 1/2000 |
| KR | 10-0265431 B1 | 6/2000 |
| WO | WO 01/10056 A1 | 2/2001 |

OTHER PUBLICATIONS

Chinese Office Action dated Aug. 3, 2007.
International Search Report dated May 24, 2003.

* cited by examiner

*Primary Examiner*—Matthew Anderson
*Assistant Examiner*—Perez M Angelica
(74) *Attorney, Agent, or Firm*—Ked & Associates, LLP

(57) ABSTRACT

Method for transmitting a power control bit and for detecting a power control rate, in which a transmission pattern of power control bits is varied with a power control rate, for making blind detection of the power control rate varied from time to time possible, wherein, when change of the power control rate is required, a base station (or a mobile station) generates the transmission pattern of the power control bits varied with the power control rate to be changed, and transmits to the mobile station (or base station), and the mobile station (or the base station) determines the changed power control rate from the received transmission pattern of the power control bits, thereby permitting stable detection of the power control rate varied from time to time.

38 Claims, 9 Drawing Sheets

METHOD FOR TRANSMITTING POWER CONTROL BITS AND DETECTING POWER CONTROL RATE

This application claims priority to PCT/KR03/00334, filed Feb. 18, 2003, published on Aug. 21, 2003, Publication No. WO 03/069808 A1 in the English language and which claimed priority to Korean Application No. 10-2002-0008458, filed Feb. 18, 2002.

TECHNICAL FIELD

The present invention relates to a mobile communication technology, and more particularly, to a method for transmitting power control bits and for detecting a control rate, in which a transmission pattern of power control bits is varied with a power control rate, for performing a blind detection of the power control rate varied according to time.

BACKGROUND ART

A mobile communication system is provided with a transmitting terminal for transmitting through a particular physical channel, and a receiving terminal for receiving through the physical channel. In general, when the physical channel is a reverse link, a mobile station is the transmitting terminal, and a base station is the receiving terminal. Opposite to this, when the physical channel is a forward link, the mobile station is the receiving terminal, and the base station is the transmitting terminal.

In the meantime, the receiving terminal which receives through the physical channel transmits a power control information or instruction called as a power control bit to the transmitting terminal, so that the transmitting terminal controls a transmission power of the physical channel according to the received information.

At least one power control bit (PCB) is transmitted in every power control group period of one frame. The frame is a transmission unit of the physical channel.

For example, referring to FIG. 1, frames each with a 20 ms length are transmitted on the physical channel. each of frame has 16 PCGs with a transmission time period of 1.25 ms. One PCB may be transmitted in one PCG period.

In general, an actual mobile communication environment varies according to time because of negative factors such as fading and interference. Such negative factors vary a quality of the physical channel according to time.

At the end, since the receiving terminal determines a quality of the physical channel presently, the receiving terminal performs a power control according to the quality.

In this instance, a power control rule is determined for the power control bit (PCB) provided from the receiving terminal. Depending on the transmission power control rule a power control rate for controlling the transmission power of the physical channel is determined. In the meantime, for controlling the transmission power of the physical channel, a specific power control rate is set up between the receiving terminal and the transmitting terminal through an initial negotiation. Then, the transmitting terminal or the receiving terminal transmits power control bits according to the negotiated power control rate. For example, if the transmitting terminal and the receiving terminal is set up at an 800 Hz power control rate in the initial negotiation, the receiving terminal transmits the power control bits at the 800 Hz power control rate. If the transmitting terminal and the receiving terminal is set up at a 400 Hz power control rate in the initial negotiation, the receiving terminal transmits the power control bits at the 400 Hz power control rate.

Occasionally, it is needed to change the power control rate. In this case, the receiving terminal is required to inform the transmitting terminal of the power control rate to be changed, so that the transmitting terminal can detect the power control rate and control transmitting power by itself. And it is difficult to perform blind rate detection without power control rate information for detecting a control rate, therefore it is needed to provide an additional supplementary device for performing a more stable detection of the control rate.

DISCLOSURE OF THE INVENTION

An object of the present invention, designed taking the problems described above into account, lies on providing a method for transmitting power control bit and for detecting power control rate, in which a transmitting terminal which is to carry out a transmission power control of a physical channel makes a stable detection of a variation of the power control rate even if a receiving terminal which receives the physical channel gives no information on the variation of the power control rate in advance, and which is suitable for the receiving terminal, which receives the physical channel so that the transmitting terminal make a stable detection of the variation of the power control rate, to vary the power control bit with the power control rate.

The objects of the present invention can be achieved by providing a method for transmitting a power control information including a first step for transmitting an initial power control bit pattern according to predetermined a power control rate, which is initially set to an initial power control rate; and transmitting a power control bit pattern gating-off at least one power control bit of the initial power control bit pattern when the power control rate is changed, without transmitting a prior notice indicating the power control rate change.

In another aspect of the present invention, there is provided a method for detecting a power control rate including a first step for detecting a variation of a power control bit pattern transmitted through a specific channel according to a change of a power control rate by measuring at least one transmission symbol energy value on the channel; and determining a power control rate corresponding to the detected variation of the power control bit pattern.

In further aspect of the present invention, there is provided a method for detecting a present power control rate from a change of a transmission pattern of power control bits without receiving a prior notice, including a first step for measuring symbol energy values of the power control bits in power control groups forming a transmission frame on a channel, through which the power control bits are received; summing the measured symbol energy values; and comparing the summed value with a prescribed threshold value and determining the present power control rate based on a result of the comparison.

In still further aspect of the present invention, there is provided a method for detecting a present power control rate from a change of a transmission pattern of power control bits received through a specific channel without receiving a prior notice, including a first step for measuring a first symbol energy value of a power control bit in an (i)th power control group of a transmission frame on the channel; measuring a second symbol energy value of a pilot bit on a pilot channel at a time period identical to that of the (i)th power control group; calculating a ratio of the first symbol energy value of the power control bit to the second symbol energy value of the pilot bit; and determining the present power control rate by detecting a present transmission pattern of the power control bits using the calculated ratios. In yet further aspect of the present invention, there is provided a method for detecting a present power control rate from a change of a transmission pattern of power control bits without receiving a prior notice, including a first step for predefining combinations (i, j) of different power control groups in a transmission frame of a channel which power control bits are received therethrough; measuring respectively transmission symbol energy values of the power control bits in each of the predefined combinations of the different power control groups; calculating ratios of the measured transmission symbol energy values for one of the predefined combinations with respect to those of other combinations; and determining the present power control rate using the calculated ratios of the predefined combinations to a preset threshold value.

BEST MODE FOR CARRYING OUT THE INVENTION

Preferred embodiments of a method for transmitting power control bit and for detecting power control rate of the present invention will be described with reference to the attached drawings.

A transmitting terminal that transmits a specific physical channel is a terminal which carries out a power control according to a power control order, and a receiving terminal that receives the physical channel is a terminal which generates and transmits the power control order. The transmitting terminal and the receiving terminal may be any one of a mobile station or a base station in a mobile communication system.

However, in the following description, the receiving terminal which generates and transmits the power control order is the base station, and the transmitting terminal which controls a transmission power of the physical channel according to an order of the power control is the mobile station. After all, the present invention described herein is not defined as unique operations of the base station and the mobile station. That is, in the present invention, the receiving terminal which generates and transmits the power control order can be the mobile station, and the transmission terminal which controls a transmission power of the physical channel under the power control order can be the base station.

Referring to FIGS. 2 to 5, in the present invention, the base station generates a power control bit transmission pattern according to a preset transmission power control rule.

Referring to FIGS. 2 to 5, the base station generates the power control bits (PCB) according to different transmission patterns depending on the present power control rate, and transmits to the mobile station through a specific channel. The channel used for transmission of the power control bits is a Forward-Common Power Control Channel (F-CPCCH), a Forward-Fundamental Channel (F-FCH), or a Forward-Dedicated Control Channel (F-DCCH). However, the channels used for transmission of the power control bit are, not limited to above channels, but other channels not described above.

Opposite to this, if the mobile station generates power control bits of different power control rates, the generated power control bits are transmitted through a reverse channel.

The base station varies the present power control rate from time to time as the case demands, and generates the power control bit according to the varied power control rate.

FIGS. 2 to 5 illustrate generation patterns as well as transmission patterns of power control bits for a power control rate of a base station.

Figure 1:
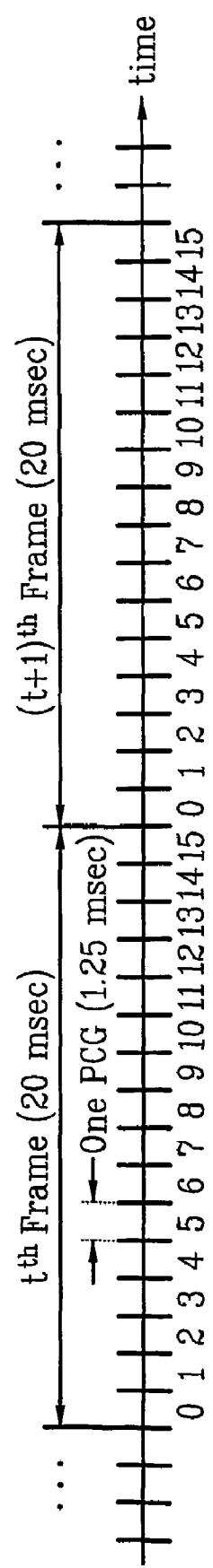
FIG. 1 illustrates a structure of a related art physical channel defined in a mobile communication system.
Figure 2:
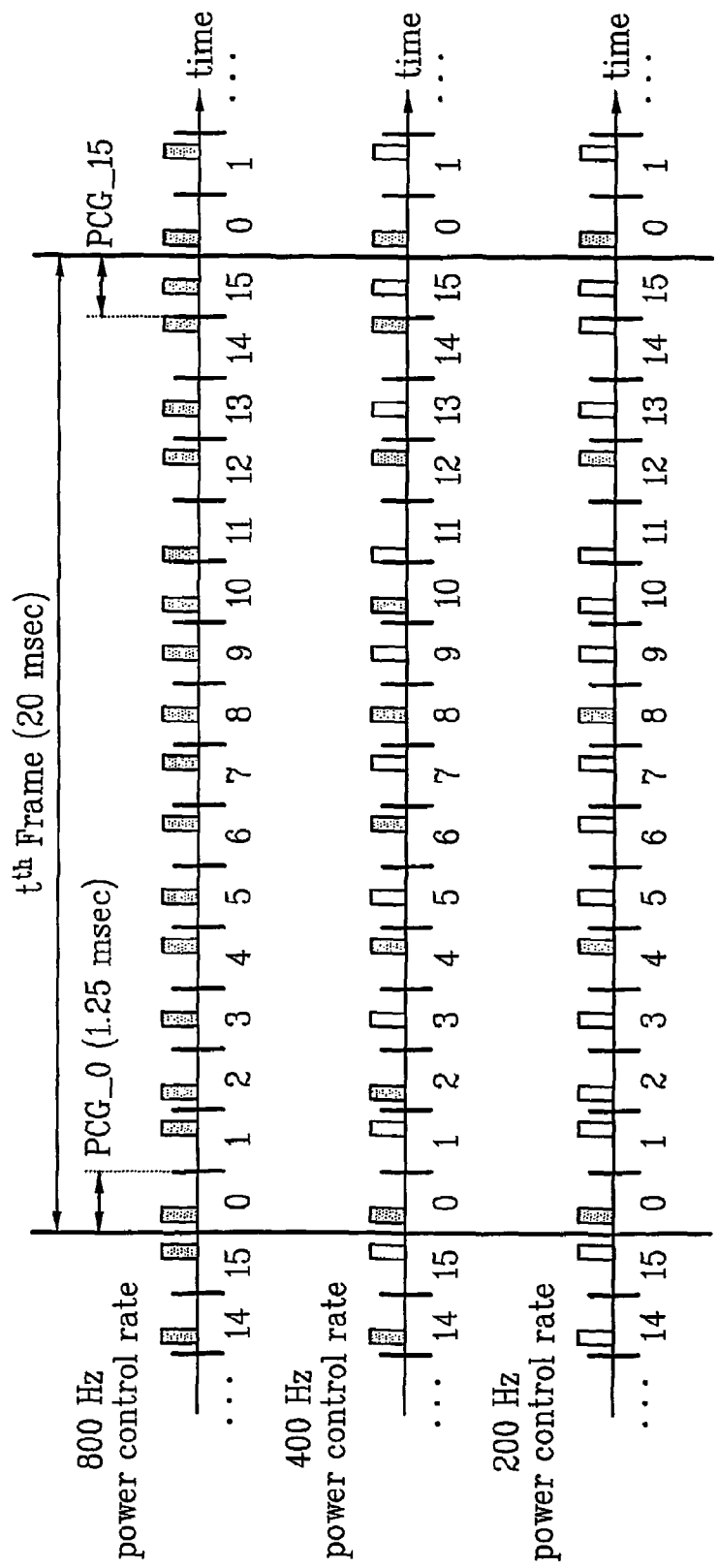
FIGS. 2 to 5 illustrate embodiments of power control bit transmission patterns according to different transmission power control rules.
Figure 4:
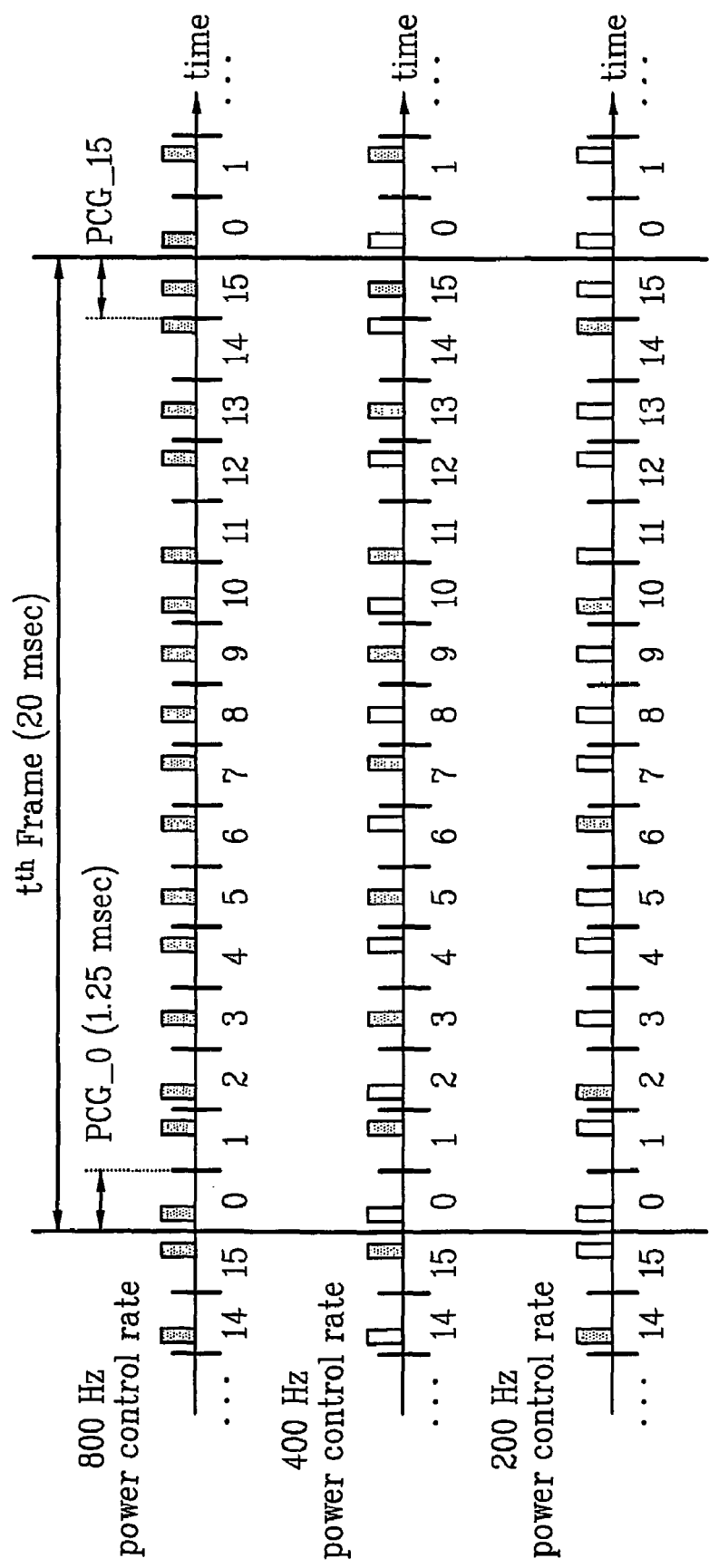
Figure 5:
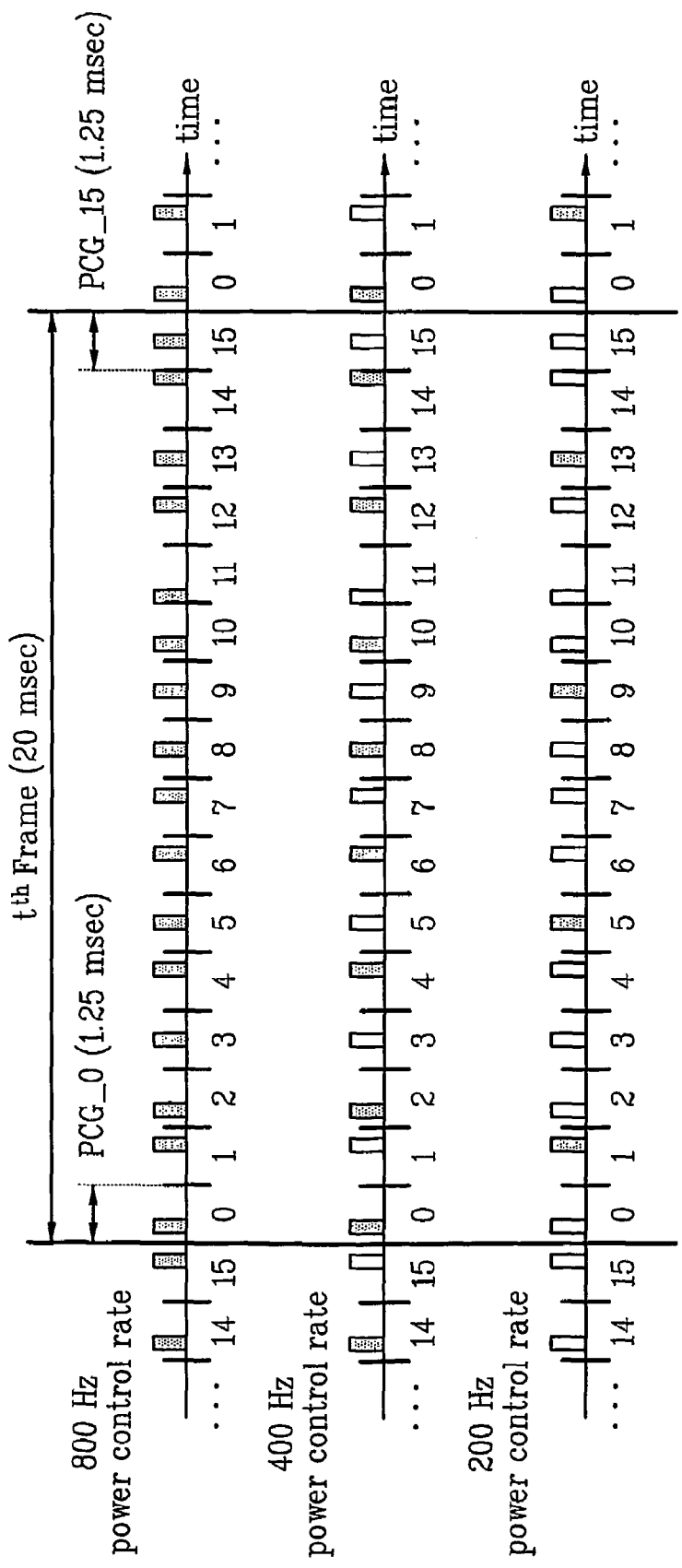

In the present invention, if the base station intends to operate at a 400 Hz or 200 Hz power control rate for a while in the middle of operation of 800 Hz power control rate as transmission power control rules, the base station generates the power control bits according to the 400 Hz. or 200 Hz power control rate transmission pattern shown in FIGS. 2, 4 or 5, and transmits to the mobile station.

Figure 3:
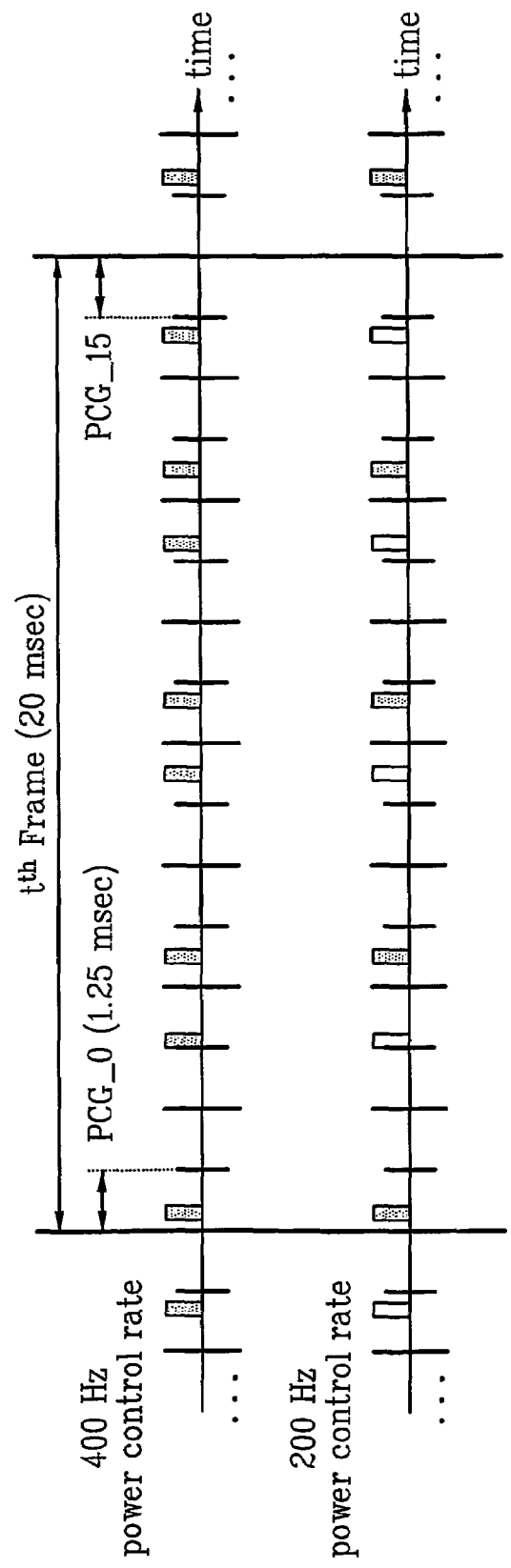

And, in the present invention, if the base station intends to operate at a 200 Hz power control rate for a while in the middle of operation of 400 Hz power control rate as transmission power control rules, the base station generates the power control bits according to the 200 Hz power control rate transmission pattern shown in FIG. 3, and transmits to the mobile station.

In summary, referring to FIGS. 2 to 5, the base station gates off the power control bit according to the following pattern rules, before transmission of the power control bit to the mobile station.

800 Hz power control rate: to transmit one PCB in each PCG period.

400 Hz power control rate: to transmit one PCB in two consecutive PCG periods. To do this, the PCB is gated off in one of the two consecutive PCG periods.

200 Hz power control rate: to transmit one PCB in four consecutive PCG periods. To do this, one PCB is gated on in one of the four consecutive PCG periods, and the PCB is gated off in the rest three consecutive PCG periods.

The power control bit transmission pattern shown in FIG. 2 will be described in more detail.

Referring to FIG. 2, if the base station intends to operate at a 400 Hz power control rate for a while in the middle of operation of 800 Hz power control rate in which one power control bit is transmitted in each PCG as transmission power control rules, the base station generates one power control bit in each of (0)th, second, fourth, sixth, eighth, tenth, twelfth, and fourteenth power control groups PCG_0, PCG_2, PCG_4, PCG_6, PCG_8, PCG_10, PCG_12, and PCG_14, and transmits the power control bits. That is, one power control bit is gated on in every odd numbered power control group, and the power control bit is gated off in every even numbered power control group. And, if the base station intends to operate at a 200 Hz power control rate for a while in the middle of operation of 800 Hz power control rate in which one power control bit is transmitted in each PCG as transmission power control rules, the base station generates one power control bit in each of (0)th, fourth, eighth, and twelfth power control groups PCG_0, PCG-4, PCG_8, and PCG_12 and transmits the power control bits.

The power control bit transmission pattern shown in FIG. 3 will be described in more detail.

Referring to FIG. 3, if the base station intends to operate at a 200 Hz power control rate for a while in the middle of operation of 400 Hz power control rate in which one power control bit is transmitted in each PCG as transmission power control rules, the base station generates one power control bit in each of (0)th, fourth, eighth, and twelfth power control groups PCG_0, PCG-4, PCG_8, and PCG_12 and transmits the power control bits. That is, at the 200 Hz power control rate, the base station gates on the power control bit only in the (0)th, fourth, eighth, and twelfth power control groups PCG_0, PCG-4, PCG_8, and PCG_12 and transmits the power control bits.

FIGS. 2 and 3 illustrate cases when the power control bit is transmitted starting from (0)th power control group PCG_0. That is, the power control bit is gated on in the (0)th power control group PCG_0 without fail whatever the power control rate is.

However, the present invention does not necessarily require the base station to transmit the power control bits starting from the (0)th power control group PCG_0. That is, as shown in FIG. 4, except the case of 800 Hz power control rate in which one power control bit is generated and transmitted in every power control group, in the cases of 400 Hz or 200 Hz power control group, the power control bits are generated and transmitted starting from the first power control group PCG_1 or second power control group PCG_2.

As another example, as shown in FIG. 5, excluding the case of 800 Hz power control rate in which one power control bit is generated and transmitted in every power control group, and the case of 400 Hz power control rate in which one power control bit is generated in every two consecutive power control groups and transmits the power control bit to the mobile station, in the case of 200 Hz power control rate, the power control bits are generated and transmitted starting from the first power control group PCG_1 or the second power control group PCG_2.

The power control bit transmission pattern shown in FIG. 4 will be described in more detail.

Referring to FIG. 4, if the base station intends to operate at a 400 Hz power control rate for a while in the middle of operation of 800 Hz power control rate in which one power control bit is transmitted in each PCG as transmission power control rules, the base station generates and transmits one power control bit in each of first, third, fifth, seventh, ninth, eleventh, thirteenth, and fifteenth power control groups PCG_1, PCG_3, PCG-5, PCG_7, PCG_9, PCG_11, PCG_13, and PCG_15. That is, one power control bit is gated on in every even numbered power control group, and the power control bit is gated off in every odd numbered power control group in the transmission. And, if the base station intends to operate at a 200 Hz power control rate for a while in the middle of operation of 800 Hz power control rate in which one power control bit is transmitted in each PCG as transmission power control rules, the base station gates on one power control bit in each of second, sixth, tenth, and fourteenth power control groups PCG_2, PCG-6, PCG_10, and PCG_14 in the transmission.

The power control bit transmission pattern shown in FIG. 5 will be described in more detail.

Referring to FIG. 5, if the base station intends to operate at a 400 Hz power control rate for a while in the middle of operation of 800 Hz power control rate in which one power control bit is transmitted in each PCG as transmission power control rules, the base station generates and transmits one power control bit in each of (0)th, second, fourth, sixth, eighth, tenth, twelfth, and fourteenth power control groups PCG_0, PCG_2, PCG-4, PCG_6, PCG_8, PCG_10, PCG_12, and PCG_14. And, if the base station intends to operate at a 200 Hz power control rate for a while in the middle of operation of 800 Hz power control rate in which one power control bit is transmitted in each PCG as transmission power control rules, the base station generates and transmits one power control bit in each of first, fifth, ninth, and thirteenth power control groups PCG_1, PCG-5, PCG_9, and PCG_13. In addition to this, though not shown in FIG. 5, if the base station intends to operate at a 200 Hz power control rate for a while in the middle of operation of 800 Hz power control rate in which one power control bit is transmitted in each PCG as transmission power control rules, the base station generates, and transmits one power control bit in each of second, sixth, tenth, and fourteenth power control groups PCG_2, PCG-6, PCG_10, and PCG_14.

As described, in the present invention, the base varies the power control rate from time to time, and varies the power control bit transmission pattern with the power control rate in transmission to the mobile station. Then, the base station provides no separate information on the variation of the power control rate of the base station to the mobile station. In this situation, the mobile station receives the power control bit and detects the present changed power control rate.

For simplicity of description, in the following description of the present invention, it is assumed that the physical channel is transmitted in frames each including a plurality of temporal power control groups (PCG). Particularly, it is assumed that one frame has 16 power control group periods.

Meanwhile, in the present invention, the mobile station measures or calculates the following energy values for detection of the present power control rate.

A symbol power value (Eb) of a power control bit (PCB).

A signal-power-to-noise-power ratio (Eb/No) of the power control bit (PCB).

A symbol power value (Ep) of a pilot bit.

A signal-power-to-noise-power ratio (Ep/No) of a pilot bit signal.

Of above energy values, the symbol power value (Eb) and the signal-power-to-noise-power ratio (Eb/No) of the power control bit (PCB) are energy values measured in the power control groups of the transmission frame that is a unit of transmission on an F-CPCCH. The symbol power value (Ep) and the signal-power-to-noise-power ratio (Ep/No) of a pilot bit signal are energy values measured on the pilot channel at identical timing with the power control group periods in which the power control bits are transmitted.

Thereafter, the mobile station detects a change of the present power control rate for power control of the physical channel by using at least one of the calculated energy values. In more detail, in the present invention, the present power control rate is detected by comparative or adding operation of the calculated energy values.

The first embodiment of the present invention is a case when the presently changed power control rate is detected by summing a symbol power (or a signal-power-to-noise-power ratio) of each of the power control bits measured in all power control groups transmitted in (t)th transmission frame. In this instance, the following equation (1) is applicable.

$$E(t) = \sum_{k=0}^{15} \left(\frac{Eb}{No}\right)_{k-PCB} \qquad (1)$$

[Above case is applicable to a case the transmission frame has 16 power control groups]

In the equation (1), the $(Eb/No)_{-PCB}$ is a signal-power-to-noise-power ratio of the power control bit measured in each of the power control groups.

The second embodiment of the present invention is a case when the presently changed power control rate is detected by calculating a ratio of symbol powers (or a signal-power-to-noise-power ratio) of power control bits measured in different power control groups in a (t)th transmission frame at least once. In this instance, the following equations (1) or (2) is applicable.

$$D_{i,j}(t) = \frac{(Eb)_{j-PCB}}{(Eb)_{i-PCB}} (i \neq j) \qquad (2)$$

$$D_{i,j}(t) = \frac{\left(\frac{Eb}{No}\right)_{j-PCB}}{\left(\frac{Eb}{No}\right)_{i-PCB}} (i \neq j) \qquad (3)$$

In the equations (2) and (3), $(Eb)_{-i-PCB}$ denotes a symbol power of the power control bit measured in an (i)th power control group, and $(Eb/No)_{-i-PCB}$ denotes a signal-power-to-noise-power ratio of the power control bit measured in the (i)th power control group. $(Eb)_{-j-PCB}$ denotes a symbol power of the power control bit measured in a (j)th (j≠i) power control group, and $(Eb/No)_{-j-PCB}$ denotes a signal-power-to-noise-power ratio of the power control bit measured in the (j)th (j≠i) power control group.

The third embodiment of the present invention is a case when the presently changed power control rate is detected by predefining combinations (i, j) of different power control groups in the (t)th transmission frame, and calculating the ratios $D_{i,j}(t)$ calculated alike the second embodiment for all the combinations. As one example, combinations of the following equation (4) are predefined.

D_{0,1}(t), D_{0,2}(t), D_{0,3}(t),

D_{4,3}(t), D_{4,2}(t), D_{4,1}(t), D_{4,5}(t), D_{4,6}(t), D_{4,7}(t),

D_{8,7}(t), D_{8,6}(t), D_{8,5}(t), D_{8,9}(t), D_{8,10}(t), D_{8,11}(t),

D_{12,11}(t), D_{12,10}(t), D_{12,9}(t), D_{12,13}(t), D_{12,14}(t), D_{12,15}(t),

D_{16,15}(t), D_{16,14}(t), D_{16,13}(t)     Equation (4)

In the equation (4), the subscripts "16" in "$D_{16,15}(t)$, $D_{16,14}(t)$, $D_{16,13}(t)$" denote the number of the (0)th power control group of (t+1)th transmission frame. Therefore, in the present invention, it is not necessarily required to includes "$D_{16,15}(t)$, $D_{16,14}(t)$, $D_{16,13}(t)$" to the combination.

In the fourth embodiment of the present invention, a ratio of a symbol power value (or a signal-power-to-noise-power ratio) of the power control bit measured in one power control group of a transmission frame to a symbol power value (or a signal-power-to-noise-power ratio) of the pilot bit measured on a pilot channel at an identical timing with the power control group is calculated at least once, for detecting the presently changed power control rate. In this instance, the following equation (5) or (6) is applicable.

$$P_i(t) = \frac{(Eb)_{i-PCB}}{(Ep)_{i-PCB}} \qquad (5)$$

$$P_i(t) = \frac{\left(\frac{Eb}{No}\right)_{i-PCB}}{\left(\frac{Ep}{No}\right)_{i-PCB}} \qquad (6)$$

In the equations (5) and (6), $(Eb)_{-i-PCB}$ denotes a symbol power of the power control bit measured in an (i)th power control group, and $(Eb/No)_{-i-PCB}$ denotes a signal-power-to-noise-power ratio of the power control bit measured in the (i)th power control group. $(Ep)_{-i-PCB}$ denotes a symbol power of the pilot bit measured on the pilot channel at a timing the same with the (i)th power control group, and $(Ep/No)_{-i-PCB}$ denotes a signal-power-to-noise-power ratio of the pilot bits measured on the pilot channel at a timing the same with the (i)th power control group.

Procedures for detecting a power control rate in accordance with different embodiments of the present invention will be described. The transmission frame described hereafter has a plurality of equally divided power control groups, and one power control bit (PCB) is transmitted in each of the power control groups.

In the meantime, hereafter, the mobile station makes a blind detection of the power control rate. In this instance, the present invention suggests to use determinative parameters calculated by equations (1) to (6).

Figure 6:
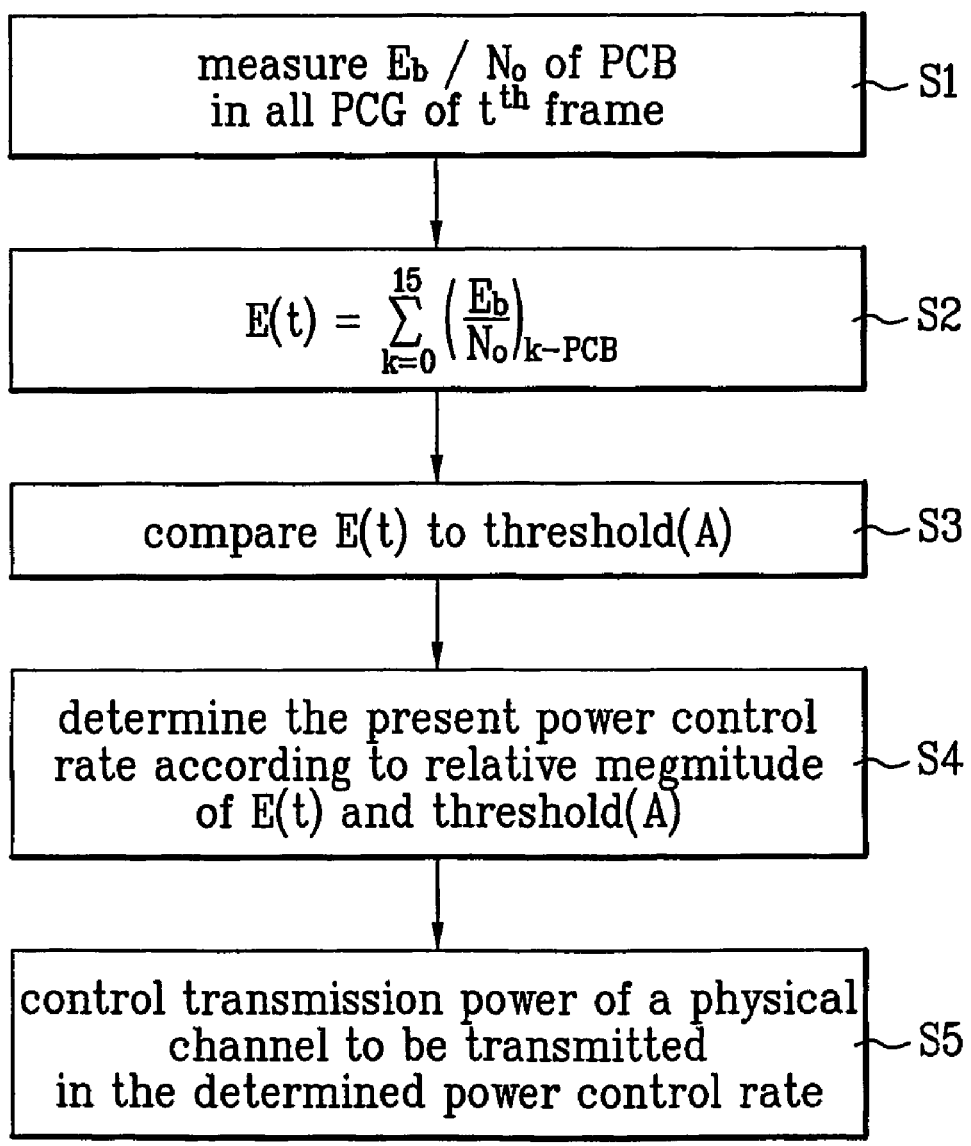
FIG. 6 illustrates a procedure for detecting a power control rate in accordance with a first preferred embodiment of the present invention.

FIG. 6 illustrates a procedure for detecting a power control rate in accordance with a first preferred embodiment of the present invention.

Referring to FIG. 6, a mobile station measures a signal-power-to-noise-power ratio of the power control bit in all power control group of a (t)th transmission frame (S1). As an option, the mobile station may measure a symbol power value of the power control bit in all power control group of the (t)th transmission frame.

Then, the signal-power-to-noise-power ratios $(Eb/No)_{-k-PCB}$ of the power control bit measured for the all power control groups are summed (S2). That is, the determinative parameter E(t) in the equation (1) is calculated.

The sum (the determinative parameter) of the signal-power-to-noise-power ratios of the power control bit is compared to a preset threshold value A (S3).

The preset threshold value A is set by using a characteristic that a change of the power control rate is proportional to a variation of a sum of the transmission symbol energy values (the symbol power values or the signal-power-to-noise-power ratios of the power control bit) measured for one transmission frame. For an example, in the recommendation of the CDMA2000-RevisionB in which 800 Hz, 400 Hz, and 200 Hz power control rates are defined as operable power control rates, an increase of the power control rate is proportional to an increase of a sum of transmission symbol energy values (symbol power values or a signal-power-to-noise-power ratio of a power control bit) of one transmission frame. If there are a sum of the transmission symbol energy values at 200 Hz power control rate and a sum of the transmission symbol energy values at 400 Hz power control rate, an average of the sums is set as one of the threshold value A-1 in advance. If there are a sum of the transmission symbol energy values at 400 Hz power control rate and a sum of the transmission symbol energy values at 800 Hz power control rate, an average of the sums is set as one of the threshold value A-2 in advance.

Then, the mobile station fixes the present power control rate depending on a relative magnitude of the preset threshold value 'A' and the sum of a signal-power-to-noise-power ratios (determinative parameters) (S4). For an example, in the recommendation of the CDMA2000-RevisionB in which 800 Hz, 400 Hz, and 200 Hz power control rates are defined as operable power control rates, when the sum of signal-power-to-noise-power ratios (determinative parameters) is compared to the threshold values A-1 and A-2, if the sum of signal-power-to-noise-power ratios (determinative parameters) is smaller than the smallest threshold values A-1, the present power control rate is determined to be 200 Hz. If the sum of the signal-power-to-noise-power ratios (determinative parameters) is greater than the smallest threshold values A-1 but smaller than the greatest threshold value A-2, the present power control rate is determined to be 400 Hz. If the sum of the signal-power-to-noise-power ratios (determinative parameters) is greater than the greatest threshold values A-2, the present power control rate is determined to be 800 Hz.

The mobile station controls the transmission power of the physical channel to be transmitted at the determined power control rate (S5).

Also, the mobile station changes the present operation mode according to the determined power control rate. For an example, if the determined power control rate is changed to 400 Hz or 200 Hz in a state the mobile station is operating in an active mode at 800 Hz power control rate, the mobile station is turned into an inactive mode.

Figure 7:
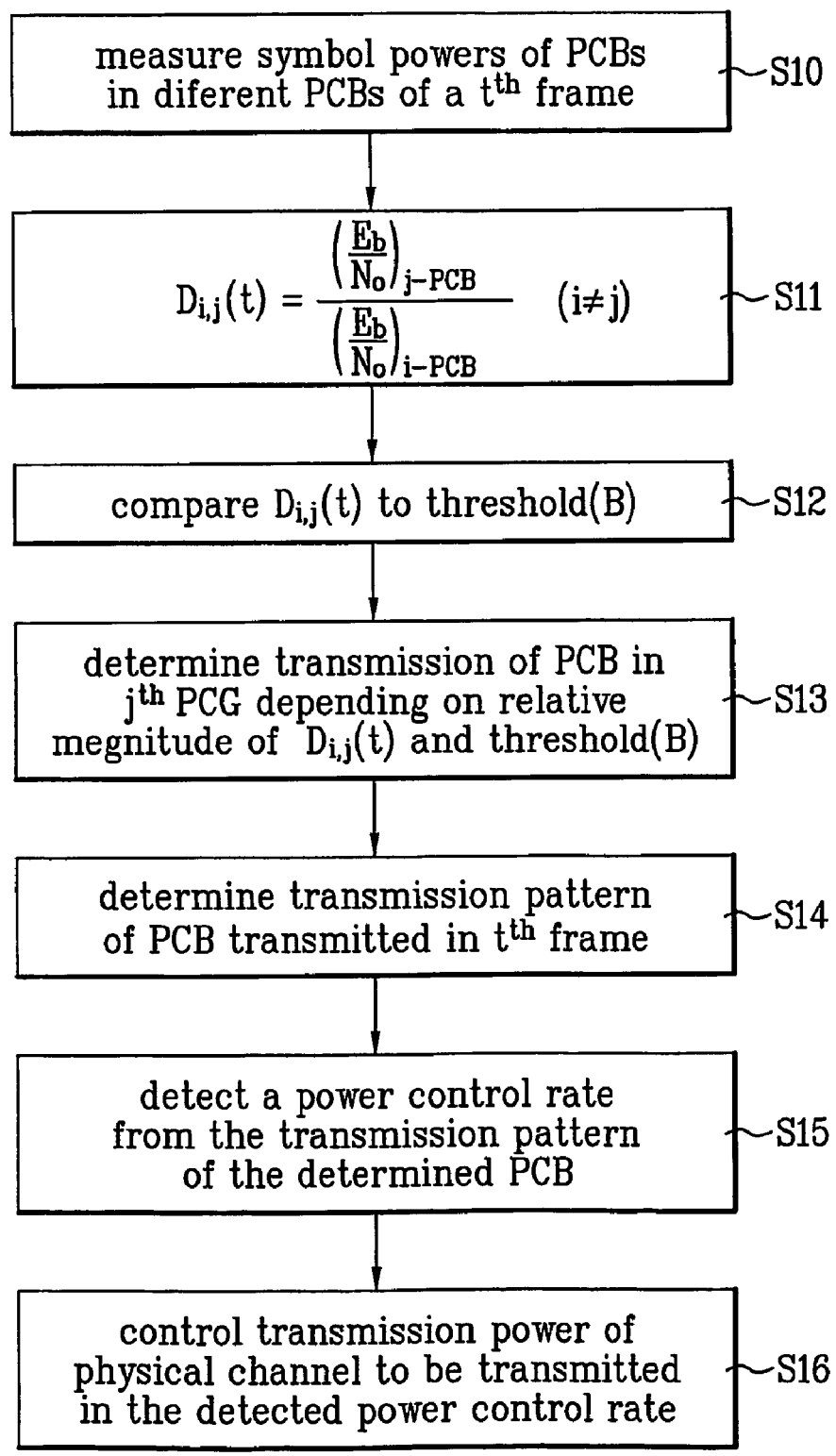
FIG. 7 illustrates a procedure for detecting a power control rate in accordance with a second preferred embodiment of the present invention.

FIG. 7 illustrates a procedure for detecting a power control rate in accordance with a second preferred embodiment of the present invention.

Referring to FIG. 7, the mobile station measures symbol power values of the power control bits in different power control groups in a (t)th transmission frame (S10). In other words, the mobile station measures a transmission symbol power of the power control bits in (i)th power control group in the (t)th transmission frame, and measures a transmission symbol power of the power control bits in (j)(i≠j)th power control group in the (t)th transmission frame. As an option, the mobile station measures a signal-power-to-noise-power ratio of the power control bits in different power control groups in the (t)th transmission frame. In other words, the mobile station measures signal-power-to-noise-power ratios of the power control bits in (i)th power control group in the (t)th transmission frame, and measures signal-power-to-noise-power ratios of the power control bits in (j)(i≠j)th power control group in the (t)th transmission frame.

Then, the mobile station calculates a ratio of the symbol power values of power control bits measured in different power control groups (S11). That is, the mobile station calculates a ratio (determinative parameter) of a transmission symbol power value of the power control bit measured in (i)th power control group (PCG) to a transmission symbol power value of the power control bit measured in (j)th power control group according to the equation (2). As an option, the mobile station may calculate a ratio (determinative parameter) of signal-power-to-noise-power ratio values of the power control bits measured in different power control groups of (t)th transmission frame. That is, the mobile station calculates a ratio (determinative parameter) of a signal-power-to-noise-power ratio of the power control bit measured in (i)th power control group (PCG) to a signal-power-to-noise-power ratio of the power control bit measured in (j)th power control group according to the equation (3).

To do this, it is preferable that the mobile station measures energy values (transmission symbol powers or signal-power-to-noise-power ratios of the power control bit) of each of the power control bits in a transmission frame having a plurality of power control groups.

Particularly, the present invention presets the power control group period in which a symbol of the power control bit is always transmitted as the (i)th power control group period. That is, the symbol (i) is a value verified from a symbol transmission pattern of the power control bits at a time in operation in a lowest power control rate among operative power control rates. For an example, in the recommendation of the CDMA2000-RevisionB in which 800 Hz, 400 Hz, and 200 Hz power control rates are defined as operable power control rates, in the case of the 800 Hz power control rate, the power control bit is transmitted in every period of the first to sixteenth power control groups, in the case of the 400 Hz power control rate, the power control bit is transmitted in one of two consecutive power control groups, and in the case of the 200 Hz power control rate, the power control bit is transmitted in one of four consecutive power control groups. In summary, in transmission of a power control bit generated according to operable different power control rates, if the power control bit is always transmitted in a (0)th power control group, the power control bit is transmitted in all power control group in the 800 Hz power control rate, the power control bit is transmitted in all odd numbered power control group in the 400 Hz power control rate, and the power control bit is transmitted in (0)th, fourth, eighth and twelfth power control groups in the 200 Hz power control rate, which is the smallest. After all, in the power control groups of the (0)th, fourth, eighth or twelfth when one power control bit is transmitted in the case of the smallest rate of the 200 Hz power control rate, the power control bit is transmitted whatever the power control rate. The present invention designates such power control group periods in each of which the power control bit is always transmitted as the (i)th power control group periods, in advance.

Thus, the power control group periods in each of which the power control bit is always transmitted is designated as the (i)th power control group periods in advance, for reducing a number of times of comparative operations carried out in a following comparison, which will be understood in a description give later.

Then, the calculated ratio (determinative parameter) is compared to a preset threshold value 'B' (S12). The preset threshold value 'B' is preset as a value smaller than the ratio (determinative parameter) calculated according to equation (2) or (3) in a case the power control bit is transmitted both in an (i)th power control group and (j)th power control group, and greater than the ratio (determinative parameter) calculated according to equation (2) or (3) in a case the power control bit is transmitted in an (i)th power control group, but not in a (j)th power control group. That is, an appropriate intermediate value of the ratio (determinative parameter) calculated according to the equation (2) or (3) in the case the power control bit is transmitted both in the (i)th power control group and (j)th power control group and the ratio (determinative parameter) calculated according to the equation (2) or (3) in the case the power control bit is transmitted in the (i)th power control group, but not in the (j)th power control group as the threshold value 'B' in advance.

As the appropriate intermediate value, an average of a ratios (determinative values) calculated for the (t)th transmission frame or a frame received before the (t)th transmission frame is used. In this instance, it is natural that the average of all ratios (determinative values) calculated for one transmission frame is an intermediate value of a ratio (determinative value) calculated in the case the power control bit (PCB) is transmitted both in (i)th PCG and (j)th PCG, and a ratio (determinative value) calculated in the case the power control bit (PCB) is transmitted in (i)th PCG, but not in (j)th PCG.

As another example, an initial ratio (determinative parameter) calculated according to equation (2) or (3) in the (t)th transmission frame is set as the threshold value "B". In this instance, it is most preferable if the initially calculated ratio (determinative parameter) is in a case the power control bit (PCB) is transmitted both in the (i)th PCG and the (j)th PCG. It is also preferable if the initially calculated ratio (determinative parameter) is in a case the power control bit (PCB) is transmitted in the (i)th PCG, but not in the (j)th PCG.

The initially calculated ratio (determinative parameter), calculated thus in the case the power control bit (PCB) is transmitted both in the (i)th PCG and the (j)th PCG, is set as the threshold value 'B' in advance. If the ratio (determinative parameter) calculated thereafter is almost same with the set threshold value within a preset range of error, in this case too, it may be determined that the power control bit (PCB) is transmitted in both of the two PCGs. Contrary to this, if the ratio (determinative parameter) calculated thereafter is smaller than the set threshold value to be outside of the preset range of error, it is determined that the power control bit (PCB) is not transmitted in the (j)th PCG.

Then, the mobile station determines transmission of the power control bit in the power control groups applied in the calculation of the ratio (determinative parameter) depending on relative magnitude of the preset threshold value 'B' and the calculated ratio (determinative value) (S13). Particularly, transmission of the power control bit in the (j)th power control group is determined. For an example, in the recommendation of the CDMA2000-RevisionB in which 800 Hz, 400 Hz, and 200 Hz power control rates are defined as operable power control rates, on comparison of the calculated ratio (determinative parameter) to the preset threshold value 'B', if the calculated ratio (determinative parameter) is smaller than the preset threshold value 'B', it is determined that the power control bit is not transmitted in the (j)th power control group, and if the calculated ratio (determinative parameter) is greater than the preset threshold value 'B', it is determined that the power control bit is transmitted in the (j)th power control group.

Then, since transmission of the power control bit in each of the power control group in the transmission frame can be known, the mobile station determines the transmission pattern of the power control bits transmitted in (t)th transmission frame (S14). For an example, in the recommendation of the CDMA2000-RevisionB in which 800 Hz, 400 Hz, and 200 Hz power control rates are defined as operable power control rates, in the case of the 800 Hz power control rate, the power control bit is transmitted in every period of the (0)th to fifteenth power control groups, in the case of the 400 Hz power control rate, the power control bit is transmitted in one of two consecutive power control groups, and in the case of the 200 Hz power control rate, the power control bit is transmitted in one of four consecutive power control groups. Since the mobile station knows the transmission pattern of the transmission bits for each of the power control rates in advance, the mobile station can determine that the determined transmission pattern of the transmission bits is for which one of the power control rates.

At the end, the mobile station can detect a power control rate from the determined transmission pattern of the power control bits (S15). Finally, the mobile station controls the transmission power of the physical channel to be transmitted in the detected power control rate (S16).

Moreover, the mobile station changes the present operation mode according to the detected power control rate. For an example, in a state the mobile station is operating in an active state at 800 Hz power control rate, if the presently detected power control rate is changed to 400 Hz or 200 Hz, the operation mode of the mobile station is changed to an inactive mode.

Figure 8:
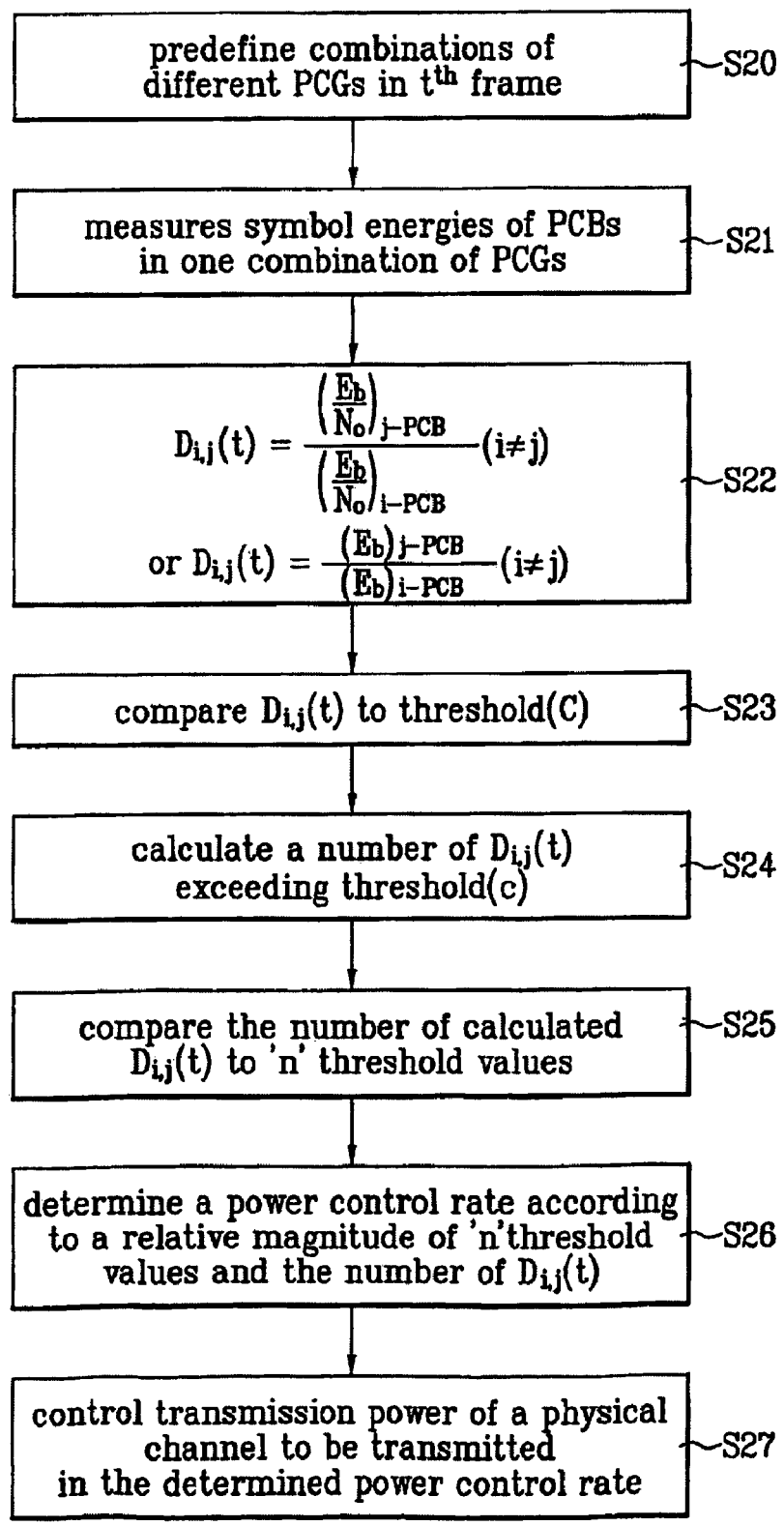
FIG. 8 illustrates a procedure for detecting a power control rate in accordance with a third preferred embodiment of the present invention.

FIG. 8 illustrates a procedure for detecting a power control rate in accordance with a third preferred embodiment of the present invention, wherein combinations (i, j) of different power control groups in one (t)th transmission frame are defined as the equation (4) in advance, the ratios $D_{i,j}$ calculated the same as the second embodiment are calculated for the combinations defined already, for detecting a presently changed power control rate.

Referring to FIG. 8, the mobile station defines the combinations of different power control groups in the (t)th transmission frame in advance (S20). Of the such an example is shown in equation (4).

For an example, in the recommendation of the CDMA2000-RevisionB in which 800 Hz, 400 Hz, and 200 Hz power control rates are defined as operable power control rates, one frame with 20 msec is divided into 16PCGs (each with 1.25 msec). Therefore, a number of combinations of the PCGs selectable in one frame is 240 in total, i.e., a permutation $_{16}P_2=240$.

After all, in the present invention, all the 240 combinations of the power control groups can be used. However, for an efficiency of a procedure for detection of the power control rate, only the combinations shown in equation (4) are used.

Then, symbol energy values (symbol powers of power control bits, or signal-power-to-noise-power ratios of power control bits) of the power control bits in one combination of the power control groups are measured respectively (S21).

Then, the mobile station calculates ratios (determinative parameters) of the respectively measured symbol energy values of the power control bits (S22). In more detail, with respect to the combination (i,j) of the power control groups, a ratio (determinative parameter) of the symbol energy value (symbol power of the power control bit, or a signal-power-to-noise-power ratio of power control bit) of the power control bit measured in the (i)th power control group, and the symbol energy value (symbol power of the power control bit, or a signal-power-to-noise-power ratio of power control bit) of the power control bit measured in the (j)th power control group is calculated according to equation (2) or (3).

Then, the mobile station repeats a step (S21) for measuring the symbol energy value (symbol powers of the power control bits, or signal-power-to-noise-power ratios of power control bits) of the power control bits in the power control groups, and a step (S22) for calculating a ratio (determinative parameter) of the measured symbol energy values of the power control bits for all the combinations of the power control groups defined in already. In the case the combinations of the equation (4) is applied to the present invention, the step (S21) for measuring the symbol energy values (symbol powers of the power control bits, or signal-power-to-noise-power ratios of power control bits) of the power control bits in the power control groups, and a step (S22) for calculating a ratio (determinative parameter) of the measured symbol energy values of the power control bits are repeated for 24 times, respectively. However, as can be known from equation (4), the repetition is not the 24 times exactly, because, as can be noted in the equation (4), the steps for measuring the symbol energy values (symbol powers of the power control bits, or signal-power-to-noise-power ratios of power control bits) of the power control bits are duplicated in some of the power control groups.

Then, the mobile station compares the calculated ratio (determinative parameter) to a preset threshold value 'C' (S23). The preset threshold value 'C' has an identical setting method with the threshold value 'B' used in the second embodiment in FIG. 7. Therefore, a detailed description for setting the threshold value will be omitted.

Then, the mobile station calculates a number of the calculated ratios (determinative parameters) exceeding the preset threshold values 'C' (S24).

Then, the number of the ratios (determinative parameters) exceeding the threshold value 'C' is compared to preset 'n' critical values (first threshold value <second threshold value <- - - <(n)th threshold value) (S25). In this instance, if a number of the operable power control rates are (n+1), a number of the preset threshold values are 'n'. For an example, in the recommendation of the CDMA2000-RevisionB in which 800 Hz, 400 Hz, and 200 Hz power control rates are defined as operable power control rates, two threshold values (first threshold value, and second threshold value) are preset. In this instance, the first threshold value is used as a reference for determining one of the 200 Hz and 400 Hz power control rates, and the second threshold value is used as a reference for determining one of the 400 Hz and 800 Hz power control rates.

At the end, one power control rate is determined for the transmission power control of the present physical channel among operative (n+1) power control rates according to relative magnitude of the number of the ratios (determinative parameters) exceeding the threshold value (C) and 'n' threshold values (S26). For an example, in the recommendation of the CDMA2000-RevisionB in which 800 Hz, 400 Hz, and 200 Hz power control rates are defined as operable power control rates, it is assumed in advance that numbers of the ratios (determinative parameters) calculated to be greater relative to the threshold values 'C' for all combinations defined in advance are 'A', 'B', and 'C' for the 800 Hz, 400 Hz, and 200 Hz power control rates, respectively. Then, relations of the first threshold value and the second threshold value with the 'A', 'B' and 'C' are "'A'>the second threshold value>'B'>the first threshold value>'C'. At the end, if the number of the calculated ratios (determinative parameter) is smaller than the first threshold value, the power control rate is determined to be 200 Hz. If the number of the calculated ratios (determinative parameter) is an intermediate number of the first threshold value and the second threshold value, the power control rate is determined to be 400 Hz. If the number of the calculated ratios (determinative parameter) is greater than the second threshold value, the power control rate is determined to be 800 Hz.

Then, the mobile station controls the transmission power of the physical channel to be transmitted in the determined power control rate (S27).

Also, the mobile station changes the present operation mode according to the detected power control rate. For an example, if the determined power control rate is changed to 400 Hz or 200 Hz in a state the mobile station is operating in an active mode at 800 Hz power control rate, the mobile station is turned into an inactive mode.

Figure 9:
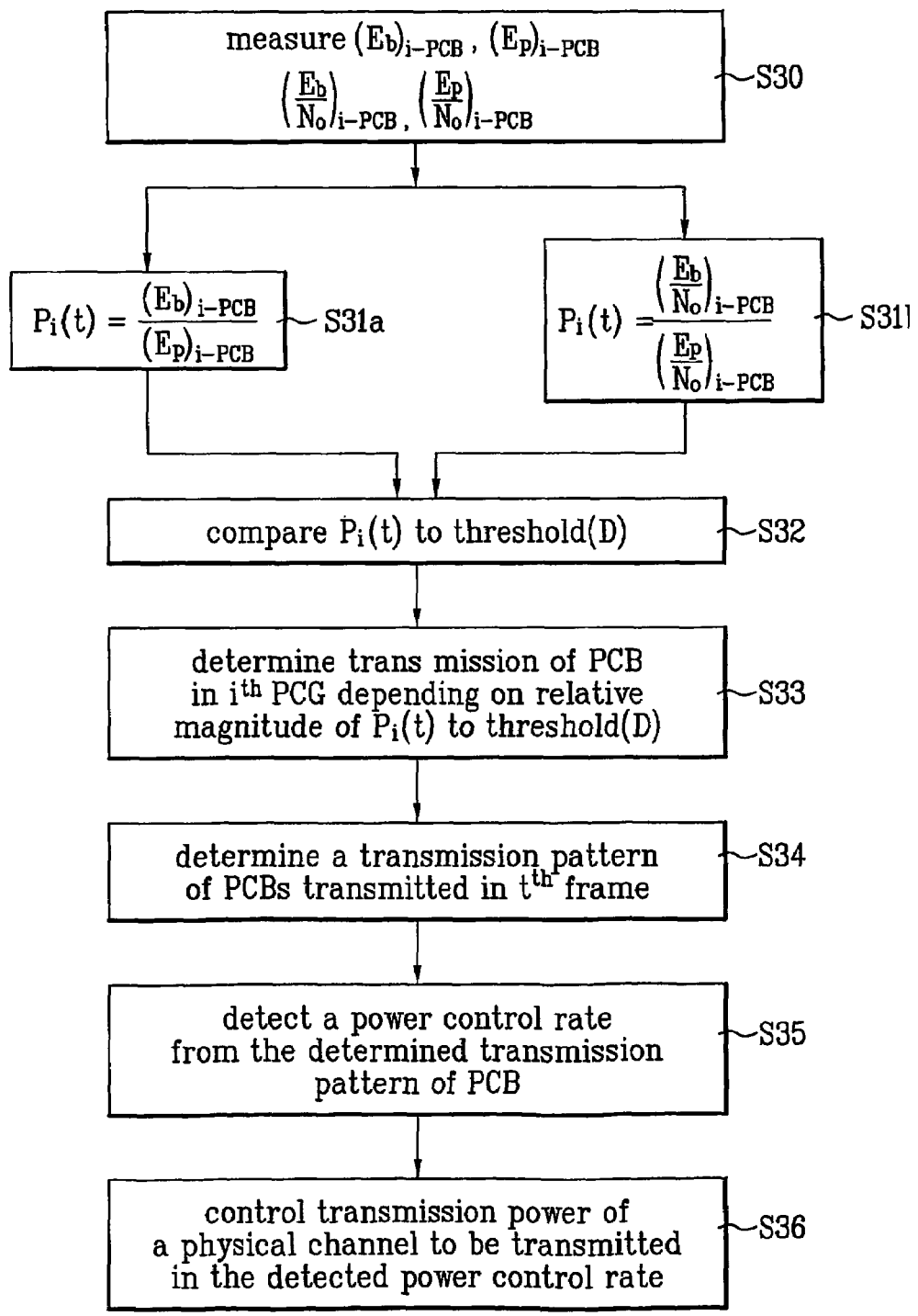
FIG. 9 illustrates a procedure for detecting a power control rate in accordance with a fourth preferred embodiment of the present invention.

FIG. 9 illustrates a procedure for detecting a power control rate in accordance with a fourth preferred embodiment of the present invention, wherein not only the transmission symbol energy of the power control bit, but also the transmission symbol energy of the pilot bit are used altogether.

Referring to FIG. 9, the mobile station measures a transmission symbol power of the power control bit in the (i)th power control group (PCG) of the (t)th transmission frame, and measures a transmission symbol power of the pilot bit of a pilot channel at a timing the same with the (i)th power control group (PCG) in which the transmission symbol power of the power control bit is calculated (S30). As an option, the mobile station measures a signal-power-to-noise-power ratio of the power control bit in the (i)th power control group (PCG), and also measures the signal-power-to-noise-power ratio of the pilot bit of the pilot channel at a timing the same with the (i)th power control group (PCG).

To do this, it is preferable that the mobile station measures an energy value (a transmission symbol power or a signal-power-to-noise-power ratio of a power control bit) for the transmission frame of a common power control channel (CPCCH) having a plurality of power control groups, and measures a transmission symbol energy value (transmission symbol power of the pilot bit or a signal-power-to-noise-power ratio of the pilot bit) of the pilot bit of a pilot channel at a timing the same with the power control groups of the CPCCH.

Then, the mobile station calculates a ratio Pi (a determinative parameter) of the transmission symbol of the power control bit measured in the (i)th power control group and the transmission symbol power of the pilot bit measured on the pilot channel at a timing the same with the (i)th power control group period according to the equation (5) (S31-a).

In the present invention, as an option, the mobile station calculates a ratio Pi (a determinative parameter) of the signal-power-to-noise-power ratio of the power control bit measured in the (i)th power control group and the signal-power-to-noise-power ratio of the pilot bit measured on the pilot channel at a timing the same with the (i)th power control group period according to the equation (6) (S31-b).

Then, the calculated ratio (determinative parameter) is compared to a preset threshold value 'D' (S32). The preset threshold value 'D' is set as a value smaller than the ratio (determinative parameter) calculated according to the equation (5) or (6) in a case the power control bit is transmitted in the (i)th power control group, and greater than the ratio (determinative parameter) calculated according to the equation (5) or (6) in a case the power control bit is not transmitted in the (i)th power control group in advance. That is, an appropriate intermediate value of the ratio (determinative parameter) calculated according to the equation (5) or (6) in a case the power control bit is transmitted in the (i)th power control group, and the ratio (determinative parameter) calculated according to the equation (5) or (6) in a case the power control bit is not transmitted in the (i)th power control group is set as the threshold value 'D' in advance.

In this instance, as the appropriate intermediate value, an average of all ratios (determinative parameters) calculated according to equation (5) or (6) for (t)th frame or frames received before the (t)th frame is used. In this instance, it is natural that the average of all ratios (determinative values) calculated for one transmission frame is an intermediate value of a ratio (determinative value) calculated in the case the power control bit (PCB) is transmitted in (i)th PCG, and a ratio (determinative value) calculated in the case the power control bit (PCB) is not transmitted in (i)th PCG.

As another example, an initial ratio (determinative parameter) calculated according to the equation (5) or (6) for a (t)th transmission frame is set as the threshold value. In this instance, it is the most preferable if the initially calculated ratio (determinative parameter) is for a case the power control bit (PCB) is transmitted in the (i)th PCG. It is also preferable if the initially calculated ratio (determinative parameter) is for a case no power control bit (PCB) is transmitted in the (i)th PCG.

The initially calculated ratio (determinative parameter), calculated thus in the case the power control bit (PCB) is transmitted in the (i)th PCG, is set as the threshold value 'D' in advance. If the ratio (determinative parameter) calculated thereafter is almost same with the set threshold value within a preset range of error, in this case too, it may be determined that the power control bit (PCB) is transmitted in all the PCGs. Contrary to this, if the ratio (determinative parameter) calculated thereafter is smaller than the set threshold value to be outside of the preset range of error, it may be determined that the power control bit (PCB) is not transmitted in the (i)th PCG.

Then, the mobile station determines transmission of the power control bit in the (i)th power control group applied in the calculation of the ratio (determinative parameter) depending on relative magnitude of the preset threshold value 'D' and the calculated ratio (determinative value) (S33). For an example, in the recommendation of the CDMA2000-RevisionB in which 800 Hz, 400 Hz, and 200 Hz power control rates are defined as operable power control rates, on comparison of the calculated ratio (determinative parameter) to the preset threshold value 'D', if the calculated ratio (determinative parameter) is smaller than the preset threshold value 'D', it is determined that the power control bit is not transmitted in the (i)th power control group, and if the calculated ratio (determinative parameter) is greater than the preset threshold value 'D', it is determined that the power control bit is transmitted in the (i)th power control group.

Then, since transmission of the power control bit in each of the power control group in the transmission frame can be known, the mobile station determines the transmission pattern of the power control bits transmitted in (t)th transmission frame (S34). For an example, in the recommendation of the CDMA2000-RevisionB in which 800 Hz, 400 Hz, and 200 Hz power control rates are defined as operable power control rates, in the case of the 800 Hz power control rate, the power control bit is transmitted in every period of the (0)th to fifteenth power control groups, in the case of the 400 Hz power control rate, the power control bit is transmitted in one of two consecutive power control groups, and in the case of the 200 Hz power control rate, the power control bit is transmitted in one of four consecutive power control groups. Since the mobile station knows the transmission pattern of the transmission bits for each of the power control rates in advance, the mobile station can determine that the determined transmission pattern of the power control bits is for which one of the power control rates.

At the end, the mobile station can detect a power control rate from the determined transmission pattern of the power control bits (S35). Finally, the mobile station controls the transmission power of the physical channel to be transmitted in the detected power control rate (S36), and changes the present operation mode according to the detected power control rate. For an example, in a state the mobile station is operating in an active state at 800 Hz power control rate, if the presently detected power control rate is changed to 400 Hz or 200 Hz, the operation mode of the mobile station is changed to an inactive mode.

Operation examples of the method for detecting a power control rate will be described additionally, taking the recommendation of the CDMA2000-RevisionB as an example, in which 800 Hz, 400 Hz, and 200 Hz power control rates are defined as operable power control rates.

FIRST OPERATION EXAMPLE

The first operation example is a case the equation (2) or (3) is used.

Referring to FIG. 2, the case is a case, when the mobile station intends to operate in one of 400 Hz and 200 Hz power control rates as necessary in the middle of 800 Hz power control rate operation, in which the mobile station selectively gates off the power control bit according to 400 Hz or 200 Hz transmission power control rule.

According to this, the mobile station is required to determine the present power control rate of being 800 Hz, 400 Hz or 200 Hz. In this instance, the mobile station calculates a ratio $D_{i,j}(t)$ in the equation (2) or (3) for each of the combinations (i, j) of the power control groups in equation (4) for a (t)th frame.

Then, out of the calculated 24 ratios $D_{i,j}(t)$, a number N(1) of values greater than a preset threshold value T(1) is calculated.

Then, in turn, the calculated number N(1) is compared to a threshold value T(2), and a threshold value T(3). (in this instance, the threshold values T(2), and T(3) are preset threshold values satisfying T(2)≦T(3).

The power control rate of the (t)th frame is determined as follows.

The power control rate=800 Hz, when N(1)≧T(3).
The power control rate=400 Hz, when T(2)≦N(1)<(T(3)
The power control rate=200 Hz, when N(1)<T(2).

SECOND OPERATION EXAMPLE

The second operation example is also a case the equation (2) or (3) is used, i.e., a case, when the mobile station intends to operate in 200 Hz power control rates as necessary in the middle of 800 Hz power control rate operation, in which the mobile station selectively gates off the power control bit according to 200 Hz transmission power control rule.

According to this, the mobile station is required to determine the present power control rate of being 800 Hz, or 200 Hz. In this instance, the mobile station calculates a ratio $D_{i,j}(t)$ in the equation (2) or (3) for each of the combinations (i, j) of the power control groups in equation (4) for the (t)th frame.

Then, out of the calculated 24 ratios $D_{i,j}(t)$, a number N(1) of values greater than a preset threshold value T(1) is calculated.

Then, in turn, the calculated number N(1) is compared to a threshold value T(4).

The power control rate of the (t)th frame is determined as follows.

The power control rate=800 Hz, when N(1)≧T(4).
The power control rate=200 Hz, when N(1)<T(4).

THIRD OPERATION EXAMPLE

The third operation example is a case the equation (5) or (6) is used.

Referring to FIG. 2, the case is a case when the mobile station intends to operate in one of 400 Hz and 200 Hz power control rates as necessary in the middle of 800 Hz power control rate operation, in which the mobile station selectively gates off the power control bit according to 400 Hz or 200 Hz transmission power control rule.

According to this, the mobile station is required to determine the present power control rate of being 800 Hz, 400 Hz or 200 Hz. In this instance, the mobile station calculates a ratio (determinative parameter) $P_0(t)$ in (0)th PCG in the equation (5) or (6) for a (t)th frame.

In this instance, if the mobile station generates, and transmits the power control bit according to 800 Hz power control rate, it may be assumed that the ratios (determinative parameters) $P_1(t)/P_2(t)/P_3(t)$ in first to third PCGs have a value similar to $P_0(t)$ calculated before. If values estimated from the ratios (determinative parameters) $P_1(t)/P_2(t)/P_3(t)$ are $\overline{P}_1(t)/\overline{P}_2(t)/\overline{P}_3(t)$, the $\overline{P}_1(t)/\overline{P}_2(t)/\overline{P}_3(t)$ are estimated based on the power control order transmitted to the base station from the mobile station. If the mobile station carries out a reverse power control of a physical channel on which power control bits are transmitted according to a specific transmission pattern, the $\overline{P}_1(t)/\overline{P}_2(t)/\overline{P}_3(t)$ are estimated based on the power control order transmitted to the base station from the mobile station. That is, the mobile station estimates transmission symbol powers of the power control bits in (0)th to fifteenth PCGs of the (t)th frame received from the base station according to the power control order the mobile station itself transmitted to the base station. The $\overline{P}_1(t)/\overline{P}_2(t)/\overline{P}_3(t)$ are calculated according to the following equations (7) to (9).

$$\overline{P}_1(t)=P_0(t)+\Delta_{0,1} \tag{7}$$

$$\overline{P}_2(t)=P_0(t)+\Delta_{0,2} \tag{8}$$

$$\overline{P}_3(t)=P_0(t)+\Delta_{0,3} \tag{9}$$

Where the $\Delta_{i,j}$, a value of $\overline{P}_j(t)$ estimated from Pi(t) and Pj(t) calculated according to equation (5) or (6) in the (i)th PCG based on the power control order the mobile station transmits to the base station, has relations with equations (7) to (9) as the following equation (10).

$$\overline{P}_j(t)=Pi(t)+\Delta_{i,j} \tag{10}$$

If the mobile station carries out no reverse power control for the physical channel on which the PCB is transmitted according to a specific transmission pattern, $\Delta_{0,1}=\Delta_{0,2}=\Delta_{0,3}$.

Then, the mobile station actually calculates the ratios (determinative parameters) $P_1(t)/P_2(t)/P_3(t)$ in the first, second and third PCGs according to equation (5) or (6) for a (t)th frame.

Then, the mobile station calculates the following equation (11).

$$DV(t,0)=P_0(t)+\{P_1(t)-\Delta_{0,1}\}+\{P_2(t)-\Delta_{0,2}\}+\{P_3(t)-\Delta_{0,3}\} \tag{11}$$

Where, DV denotes a detection value which can determine the present power control rate.

If the transmission pattern of actually transmitted PCBs is according to the 800 Hz power control rate, the following equation (12) will be brought about.

$$DV(t,0)=4P_0(t) \tag{12}$$

If the transmission pattern of actually transmitted PCBs is according to the 400 Hz power control rate, the following equation (13) will be brought about.

$$DV(t,0)=2P_0(t) \tag{13}$$

If the transmission pattern of actually transmitted PCBs is according to the 200 Hz power control rate, the following equation (13) will be brought about.

$$DV(t,0)=P_0(t) \tag{14}$$

In this instance, since the equation (11) is a detection value from which the present power control rate in (0)th to third PCGs in (t)th frame can be determined, after measuring $P_4(t), P_5(t), ---, P_{15}(t)$ in fourth to fifteenth PCGs of the (t)th frame, the mobile station calculates the detection values DV(t,1), DV(t,2), and DV(t,3) respectively according to the following equation (15) from which the present power control rate can be determined.

$$DV(t,s)=P_{4s}(t)+\{P_{4s+1}(t)-\Delta_{4s,4s+1}\}+\{P_{4s+2}(t)-\Delta_{4s,4s+2}\}+\{P_{4s+3}(t)-\Delta_{4s,4s+3}\} \tag{15}$$

If the transmission pattern of actually transmitted PCBs is according to the 800 Hz power control rate, the following equation (16) will be brought about.

$$DV(t,s)=4P_s(t) \tag{16}$$

If the transmission pattern of actually transmitted PCBs is according to the 400 Hz power control rate, the following equation (17) will be brought about.

$$DV(t,s)=2P_s(t) \tag{17}$$

If the transmission pattern of actually transmitted PCBs is according to the 200 Hz power control rate, the following equation (18) will be brought about.

$$DV(t,s)=P_s(t) \tag{18}$$

The mobile station compares the DV(t,s) calculated in above equations to preset threshold values (T(5) and T(6)).

The power control rate of the (t)th frame is determined as follows.

The power control rate=800 Hz, $DV(t,s) \geq T(\mathbf{6})$.
The power control rate=400 Hz, $T(\mathbf{5}) \leq DV(t,s) < T(\mathbf{6})$
The power control rate=200 Hz, $DV(t,s) < T(\mathbf{5})$.

The T(5) and T(6) are threshold values preset based on Ps(t), such as $T(\mathbf{5})=1.5Ps(t)$, and $T(\mathbf{6})=3Ps(t)$.

According to the third operation example, since the mobile station calculates the detection values DV(t,s) for four times for one frame, four times of power control rate detection process are carried out. At the end, the mobile station determines a power control rate to be changed finally, by putting all above four times of power control rate detection processes together.

FOURTH OPERATION EXAMPLE

The fourth operation example is also a case the equation (5) or (6) is used, i.e., a case when the mobile station intends to operate in 200 Hz power control rates as necessary in the middle of 800 Hz power control rate operation, in which the mobile station selectively gates off the power control bit according to the 200 Hz transmission power control rule.

In this instance, the mobile station measures ratios (determinative parameters) $P_0(t)/P_1(t)/P_2(t)/ - - - /P_{15}(t)$ in (0)th to fifteenth PCGs for (t)th frame. Then, DV(t,0), DV(t,1), DV(t,2), and DV(t,3) are calculated according to equation (15).

Then, the mobile station compares the calculated D(t,s) to a preset threshold value T(7).

The power control rate of the (t)th frame is determined as follows.

The power control rate=800 Hz, $DV(t,s) \geq T(\mathbf{7})$.
The power control rate=200 Hz, $DV(t,s) < T(\mathbf{7})$.

The T(7) is a threshold value preset based on Ps(t), such as $T(\mathbf{7})=2.5Ps(t)$.

Alike the third operation example, in the fourth operation example, since the mobile station calculates the detection values DV(t,s) for four times for one frame, four times of power control rate detection process are carried out. At the end, the mobile station determines a power control rate to be changed finally, by putting all above four times of power control rate detection processes together.

FIFTH OPERATION EXAMPLE

The fifth operation example is a case the equation (1) is used.

Referring to FIG. 2, this is a case when the mobile station intends to operate in one of 400 Hz or 200 Hz power control rates as necessary in the middle of 800 Hz power control rate operation, in which the mobile station selectively gates off the power control bit according to the 400 Hz or 200 Hz transmission power control rule.

According to this, the mobile station is required to determine the present control rate being which one of the 800/400/200 Hz power control rates. The mobile station sums symbol power values of the power control bits measured in all the PCGs of the (t)th frame, to obtain an E(t).

Then, the mobile station compares the calculated E(t) to preset threshold values T(8) and T(9).

In this instance, the power control rate of the (t)th frame is determined as follows.

The power control rate=800 Hz, $E(t) \geq T(7)$.
The power control rate=400 Hz, $T(8) \leq E(t) < T(9)$.
The power control rate=200 Hz, $E(t) < T(8)$.

The T(8) and T(9) are preset threshold values preset, such as $T(8)=6(Eb/No)_{o\text{-}PCB}$, and $T(9)=12(Eb/No)_{o\text{-}PCB}$. The $(Eb/No)_{o\text{-}PCB}$ is a signal-power-to-noise-power ratio of the power control bit measured in (0)th power control group in (t)th frame.

SIXTH OPERATION EXAMPLE

The sixth operation example is also a case the equation (1) is used, i.e., a case when the mobile station intends to operate in 200 Hz power control rates as necessary in the middle of 800 Hz power control rate operation, in which the mobile station selectively gates off the power control bit according to the 200 Hz transmission power control rule.

According to this, the mobile station is required to determine the present control rate being which one of the 800/200 Hz power control rates. The mobile station sums symbol power values of the power control bits measured in all the PCGs of the (t)th frame, to obtain an E(t).

Then, the mobile station compares the calculated E(t) to a preset threshold value T(10). In this instance, the power control rate of the (t)th frame is determined as follows.

The power control rate=800 Hz, $E(t) \geq T(10)$.
The power control rate=200 Hz, $E(t) < T(10)$.

The T(10) is a preset threshold value preset, such as $T(10)=10(Eb/No)_{o\text{-}PCB}$. The $(Eb/No)_{o\text{-}PCB}$ is a signal-power-to-noise-power ratios of the power control bit measured in (0)th power control group in (t)th frame.

Moreover, the present invention can detect the power control rate more exactly by combining the first to fourth embodiments, which is a matter of realization.

Industrial Applicability

The method for transmitting a power control bit and for detecting a power control rate of the present invention permits the mobile station (or the base station) to make a stable detection of a changed power control rate from by making the base station (or the mobile station) to generate and transmit power control bits according to the changed power control rate when the base station (or the mobile station) changes the power control rate.

Moreover, the mobile station (or the base station), which is to carry out transmission power control of the physical channel, can detect the presently changed power control rate without any error even if the base station (or mobile station) gives no information on the change of the power control rate in advance. Accordingly, since the base station (or the mobile station) is required to give no information on the change of the power control rate to the mobile station (or the base station) in advance, an occupation of an extra specific channel resource is not required.

At the end, since no extra specific channel resource is required, which has been required for an exact detection of the presently changed power control rate at the mobile station (or the base station), an entire communication resource can be saved.

In addition to this, a performance of the entire communication system can be improved by the saving of the entire communication resource.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for a receiving terminal to transmit power control information for a transmitting terminal to detect a power control rate change using power control bits itself, the method comprising:
    (a) transmitting the power control bits having an initial power control bit pattern according to a predetermined power control rate, which is initially set to an initial power control rate; and
    (b) transmitting a bit pattern changed power control bits having a power control bit pattern gating-off at least one power control bit of the initial power control bit pattern when the power control rate is changed, without transmitting a prior notice indicating the power control rate change,
    wherein the bit pattern changed power control bits is used by the transmitting terminal for detecting the power control rate change,
    wherein the initial power control rate is 800 Hz, and
    when the power control rate is changed to 400 Hz, step (b) comprises gating-off a power control bit in any one of every two consecutive power control groups (PCGs) of a set of PCGs forming a transmission frame of a common power control channel (CPCCH); and
    when the power control rate is changed to 200 Hz, step (b) comprises gating-off three consecutive power control bits in every four consecutive power control groups (PCGs) of the set of PCGs.

2. A method for a transmission terminal to detect a power control rate using received power control bits itself, which are transmitted by a transmitting terminal, wherein the power control rate is a rate for transmitting the power control bits, the method comprising:
    (a) detecting a variation of a power control bit pattern of the received power control bits received through a specific channel by measuring at least one transmission symbol energy value on the channel, wherein the received power control bits is transmitted by the receiving terminal to have the power control bit pattern according to a change of the power control rate; and
    (b) determining the power control rate corresponding to the detected variation of the power control bit pattern,
    wherein the step (a) includes a step of detecting a transmission of the power control bits for one of 800 Hz, 400 Hz, and 200 Hz power control rates, and wherein the detecting the transmission of the power control bits comprises detecting a transmission of one power control bit in every power control group (PCG) which forms a transmission frame of the channel according to an 800 Hz power control rate, or detecting a transmission of a power control bit in one of two consecutive power control groups (PCGs) which form the transmission frame of the channel according to a 400 Hz power control rate, or detecting a transmission of one power control bit in one of four consecutive PCGs which form the transmission frame of the channel according to a 200 Hz power control rate.

3. The method as claimed in claim 2, wherein the step (a) includes:

measuring at least one of transmission symbol energy values in power control groups which form a transmission frame on the channel;

calculating ratios of one of the measured transmission symbol energy values with another of the measured transmission symbol energy values; and detecting the power control bit pattern by determining whether a power control bit in each of the power control groups has been received using the calculated ratios.

4. The method as claimed in claim 3, wherein the step of measuring the at least one of transmission symbol energy values includes a step of measuring respectively transmission symbol power of power control bits in different power control groups, and wherein the step of calculating the ratio includes a step of calculating a ratio of the measured transmission symbol powers.

5. The method as claimed in claim 3, wherein the step of measuring the at least one of transmission symbol energy values includes a step of measuring respectively a signal-power-per-symbol-to-noise-power ratio (Eb/No) of power control bits in different power control groups, and wherein the step of calculating the ratio includes a step of calculating a ratio of the measured Eb/No of the power control bits.

6. The method as claimed in claim 3, wherein the step of measuring the at least one of transmission symbol energy values includes the steps of:

measuring a first transmission symbol power of a power control bit in a first power control group; and measuring a second transmission symbol power of a pilot bit on a pilot channel at a time period identical to that of the first power control group in which the first transmission symbol power is measured, and wherein the step of calculating the ratio includes a step of calculating a ratio of the first transmission symbol power of the power control bit and the second transmission symbol power of the pilot bit.

7. The method as claimed in claim 3, wherein the step of measuring the at least one of transmission symbol energy values includes the steps of:

measuring a signal-power-per-symbol-to-noise-power ratio (Eb/No) of a power control bit in a power control group; and further measuring a second signal-power-per-symbol-to-noise-power ratio (Ep/No) of a pilot bit on a pilot channel at a time period identical to that of the power control group in which the Eb/No is measured, and wherein the step of calculating the ratio includes a step of calculating a ratio of the measured Eb/No of the power control bit and the measured Ep/No of the pilot bit.

8. The method as claimed in claim 3, wherein the step of measuring the at least one of transmission symbol energy values includes the steps of:

(d) measuring energy values of transmission symbols in power control groups which form a transmission frame on the channel, (e) summing the measured energy values of the transmission symbols of each transmission frame, and (f) determining a power control rate using the summed value.

9. The method as claimed in claim 8, wherein the step (d) or (e) includes a step of measuring at least one of a signal-power-per-symbol-to-noise-power ratio (Eb/No) of power control bits of all power control groups in the transmission frame on the channel, and summing the measured Eb/Nos.

10. The method as claimed in claim 2, further comprising a step of (g) predefining combinations (i, j) of different power control groups in a transmission frame on the channel before the step (a).

11. The method as claimed in claim 10, further comprising:

(h) measuring energy values of transmission symbols in the predefined combinations of the different power control groups;

(i) calculating a ratio of the measured energy values of the transmission symbols for the predefined combinations, and (j) determining a power control rate using the calculated ratio for the predefined combinations.

12. The method as claimed in claim 11, wherein the step (h) includes a step of measuring respectively transmission symbol power of power control bits in the different power control groups of the predefined combination.

13. The method as claimed in claim 11, wherein the step (h) includes a step of measuring respectively a signal-power-per-symbol-to-noise-power ratio (Eb/No) of power control bits in the different power control groups of the predefined combination.

14. The method as claimed in claim 11, wherein the step (j) includes a step of comparing respectively the calculated ratios of the predefined combinations to a preset threshold value, and determining one power control rate according to a number of the combinations each having the ratio relatively greater than the threshold value.

15. A method for a transmitting terminal to determine a present power control rate without receiving a prior notice from a receiving terminal, wherein the power control rate is a rate for transmitting the power control bits, the method comprising:

(a) measuring symbol energy values of the power control bits in power control groups forming a transmission frame on a channel, through which the power control bits are received, wherein the power control bits is transmitted by the receiving terminal to have a power control bit pattern according to a change of the power control rate;

(b) summing the measured symbol energy values; and (c) comparing the summed value with a prescribed threshold value and determining the present power control rate based on a result of the comparison.

16. The method as claimed in claim 15, wherein the step (a) includes a step of measuring one of a symbol power and a signal-power-to-noise-power ratio (Eb/No) of the power control bits in each of the power control groups.

17. The method as claimed in claim 15, wherein at least one threshold value is set by using a characteristic which a sum of transmission symbol energies changes in proportion to a change of the transmission pattern of the power control rate.

18. A method for a transmitting terminal to determine a present power control rate from a change of a transmission pattern of power control bits received from a receiving terminal through a specific channel without receiving a prior notice, wherein the power control rate is a rate for transmitting the power control bits, the method comprising:

(a) measuring symbol energy values of the received power control bits in power control groups of a transmission frame on the channel, wherein the received power control bits are transmitted by the receiving terminal to have the power control bit pattern according to a change of the power control rate;

(b) calculating respective ratios of one of the measured symbol energy values with respect to another of the measured symbol energy values; and (c) determining the present power control rate by detecting a present transmission pattern of the power control bits using the calculated ratios.

19. The method as claimed in claim 18, wherein the step (a) includes a step of measuring a transmission symbol power of power control bits (PCBs) in an (i)th power control group, and measuring the transmission symbol power of power control bits (PCBs) in a (j)th (j≠i) power control group, for the transmission frame having a plurality of power control groups (PCGs).

20. The method as claimed in claim 18, wherein the step (a) includes a step of measuring a signal-power-to-noise-power ratio (Eb/No) of power control bits (PCBs) in an (i)th power control group, and measuring the Eb/No of power control bits (PCBs) in a (j)th (j≠i) power control group, for the transmission frame having a plurality of power control groups (PCGs).

21. The method as claimed in claim 18, wherein the step (b) includes a step of calculating the ratios by using one of the following equations $$D_{i,j}(t) = \frac{(Eb)_{j-PCB}}{(Eb)_{i-PCB}} (i \neq j), \text{ and}$$

$$D_{i,j}(t) = \frac{\left(\frac{Eb}{No}\right)_{j-PCB}}{\left(\frac{Eb}{No}\right)_{i-PCB}} (i \neq j)$$

Where, (Eb)_$_{i\text{-}PCB}$ denotes a symbol power of the power control bits measured in an (i)th power control group, (Eb/No)_$_{i\text{-}PCB}$ denotes a power ratio of the power control bit signal to a noise measured in the (i)th power control group, (Eb)_$_{j\text{-}PCB}$ denotes a symbol power of the power control bits measured in a (j)th (j≠i) power control group, and (Eb/No)_$_{j\text{-}PCB}$ denotes a power ratio of the power control bit signal to a noise measured in the (j)th (j≠i) power control group.

22. The method as claimed in claim 21, wherein the (i)th power control group used for calculating the ratios is predetermined, wherein the (i) denotes a number of a power control group in which power control bit are transmitted when the lowest rate of a power control rate is in operation among operable power control rates.

23. The method as claimed in claim 18, wherein the step (c) includes;

comparing the calculated ratios to a preset threshold values;

determining a transmission of the power control bits in the power control groups according to a magnitude of ratios with respect to the preset threshold value; and detecting a transmission pattern of the power control bits in the transmission frame according to the transmission of the power control bits.

24. The method as claimed in claim 23, wherein the threshold value is set as an average of energy values measured for each power control group of the transmission frame in the channel.

25. The method as claimed in claim 23, wherein the step of detecting the transmission pattern includes a step of detecting the transmission pattern of the power control bits as a transmission frequency of the power control bits is confirmed following determination of the transmission of the power control bits in the transmission frame.

26. A method for a transmitting terminal to determine a present power control rate from a change of a transmission pattern of power control bits received from a receiving terminal through a specific channel without receiving a prior notice, wherein the power control rate for transmitted the power control bits, the method comprising the steps of:

(a) measuring a first symbol energy value of a received power control bit in an (i)th power control group of a transmission frame on the channel, wherein the received power control bit is transmitted by the receiving terminal to have the power control bit pattern according to a change of the power control rate;

(b) measuring a second symbol energy value of a pilot bit on a pilot channel at a time period identical to that of the (i)th power control group;

(c) calculating a ratio of the first symbol energy value of the power control bit to the second symbol energy value of the pilot bit; and (d) determining the present power control rate by detecting a present transmission pattern of the power control bits using the calculated ratios.

27. The method as claimed in claim 26, wherein the step (a) or (b) includes a step of measuring a first transmission symbol power of the power control bits (PCBs) in the (i)th power control group and measuring a second transmission symbol power of the pilot bits on the pilot channel at the time period identical to that of the (i)th power control group.

28. The method as claimed in claim 26, wherein the step (a) or (b) includes a step of measuring a signal-power-to-noise-power ratio (Eb/No) of the power control bits (PCBs) in the (i)th power control group, and measuring a signal-power-to-noise-power ratio (Ep/No) of the pilot bits on the pilot channel at the time period identical to that of the (i)th power control group.

29. The method as claimed in claim 26, wherein the step (c) includes a step of calculating the ratios by using one of the following equations $$P_i(t) = \frac{(Eb)_{i-PCB}}{(Ep)_{i-PCB}}, \text{ and}$$

$$P_i(t) = \frac{\left(\frac{Eb}{No}\right)_{i-PCB}}{\left(\frac{Ep}{No}\right)_{i-PCB}}$$

Where, (Eb)_$_{i\text{-}PCB}$ denotes a symbol power of the power control bit measured in an (i)th power control group, (Eb/No))_$_{i\text{-}PCB}$ denotes a power ratio of the power control bit signal to a noise measured in the (i)th power control group, (Ep))_$_{i\text{-}PCB}$ denotes a symbol power of the pilot bit measured on the pilot channel at a timing the same with the (i)th power control group, and (Ep/No))_$_{i\text{-}PCB}$ denotes a power ratio of the power control bit signal to a noise measured on the pilot channel at a timing the same with the (i)th power control group.

30. The method as claimed in claim 26, wherein the fourth step includes the step of;

comparing the calculated ratios to the preset threshold value, determining transmission of the power control bit in the (i)th power control group according to a magnitude of the ratios with respect to the preset threshold value, and detecting the transmission pattern of the power control bits according to transmission of the power control bits in respective power control groups in the transmission frame.

31. The method as claimed in claim 30, wherein the present transmission pattern of the power control bits is detected as a transmission frequency of the power control bits is determined following determination of the transmission of the power control bits in the respective power control group of the transmission frame.

32. A method for detecting a present power control rate from a change of a transmission pattern of power control bits without receiving a prior notice, the method comprising the steps of:
   (a) predefining combinations (i, j) of different power control groups in a transmission frame of a channel which power control bits are received therethrough;
   (b) measuring respectively transmission symbol energy values of the power control bits in each of the predefined combinations of the different power control groups;
   (c) calculating ratios of the measured transmission symbol energy values for one of the predefined combinations with respect to those of other combinations; and
   (d) determining the present power control rate using the calculated ratios of the predefined combinations to a preset threshold value.

33. The method as claimed in claim 32, wherein the step (b) includes a step of measuring respectively a transmission symbol power of the power control bits in the predefined combinations of the different power control groups.

34. The method as claimed in claim 32, wherein the step (b) includes a step of measuring respectively a signal-power-per-symbol-to-noise-power ratio of the power control bits in the predefined combinations of the different power control groups.

35. The method as claimed in claim 32, wherein the step (c) includes a step of calculating the ratios by using one of the following equations for the predefined combinations $$D_{i,j}(t) = \frac{(Eb)_{j-PCB}}{(Eb)_{i-PCB}} (i \neq j), \text{ and}$$

$$D_{i,j}(t) = \frac{\left(\frac{Eb}{No}\right)_{j-PCB}}{\left(\frac{Eb}{No}\right)_{i-PCB}} (i \neq j)$$

Where, $(Eb)_{\_i\text{-}PCB}$ denotes a symbol power of the power control bit measured in an (i)th power control group, $(Eb/No)_{\_i\text{-}PCB}$ denotes a power ratio of the power control bit signal to a noise measured in the (i)th power control group, $(Eb)_{\_j\text{-}PCB}$ denotes a symbol power of the power control bit measured in a (j)th (j≠i) power control group, and $(Eb/No)_{\_j\text{-}PCB}$ denotes a power ratio of the power control bit signal to a noise measured in the (j)th (j≠i) power control group.

36. The method as claimed in claim 32, wherein the step (d) includes;
   comparing the calculated ratios for the predefined combinations to the preset threshold value, and
   determining the power control rate according to a number of the combinations of which relative ratio is calculated to be greater than the threshold value.

37. The method as claimed in claim 32, wherein the step (d) includes;
   comparing calculated ratios to a preset first threshold value as the transmission symbol energy values calculated in (j)(j≠i)th transmission period is divided by the transmission symbol energy value calculated in (i)th transmission period, to obtain a plurality of calculated ratios $D_{ij}$ in the step (c),
   calculating a number of combinations of (i, j)th transmission periods in which parameter values relatively greater than the first threshold value are calculated,
   comparing the calculated number of combinations to preset 'n' threshold values, and
   determining one power control rate for a transmission power control of a present physical channel from operable (n+1) power control rates using the calculated number of combinations to the 'n' threshold values.

38. A method for a transmitting terminal to determine a power control rate in a receiver of the transmitting terminal that operates according to the power control rate, using received power control bits itself, wherein the power control rate is a rate for transmitting the power control bits, the method comprising the steps of:
   determining gate-on or gate-off of the received power control bits in each of power control periods of a received transmission frame by using symbol energy values of the power control bits in the power control periods when the power control rate is changed without reception of a prior notice indicating the power control rate change, wherein the received power control bits are transmitted by a receiving terminal to have the power control bit pattern according to a change of the power control rate; and
   determining the power control rate according to a result of the determination.

* * * * *